United States Patent
Liebig

(10) Patent No.: US 6,223,536 B1
(45) Date of Patent: May 1, 2001

(54) STARTING UP A STEAM SYSTEM, AND STEAM SYSTEM FOR CARRYING OUT THE METHOD

(75) Inventor: Erhard Liebig, Laufenburg (DE)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/421,928

(22) Filed: Oct. 21, 1999

(30) Foreign Application Priority Data

Oct. 22, 1998 (DE) .............................................. 198 48 748

(51) Int. Cl.[7] .................................................... F01K 13/02
(52) U.S. Cl. ................. 60/646; 60/656; 60/657; 60/679
(58) Field of Search ................................ 60/39.181, 646, 60/656, 657, 670, 679

(56) References Cited

U.S. PATENT DOCUMENTS

| | | | |
|---|---|---|---|
| 5,095,706 | * | 3/1992 | Saito et al. .............................. 60/446 |
| 5,477,683 | * | 12/1995 | Persson ................................ 60/646 X |
| 5,794,446 | * | 8/1998 | Earley et al. ............................ 60/446 |

FOREIGN PATENT DOCUMENTS

| | | |
|---|---|---|
| 1001286 | 1/1957 | (DE) . |
| 970543 | 9/1958 | (DE) . |
| 4132315C2 | 3/1994 | (DE) . |
| 4432960C1 | 11/1995 | (DE) . |
| 4447044C1 | 4/1996 | (DE) . |

* cited by examiner

*Primary Examiner*—Hoang Nguyen
(74) *Attorney, Agent, or Firm*—Burns, Doane, Swecker & Mathis, L.L.P.

(57) ABSTRACT

A drum-type heat-recovery boiler (2) forms, together with the feedwater tank/deaerator (6) and condenser/hot well (4), the steam system of a combined-cycle power station. This steam system has a plurality of containers (10, 16, 22, 6, 4) working at different pressure stages. Some of the containers are formed by steam drums (10, 16, 22). The container of the lowest pressure stage is the condenser/hot well (4). The high-pressure steam drum (10) is connected directly to the intermediate-pressure steam drum (16) via a water line (25) and a steam line (39). The intermediate-pressure steam drum (16) is connected directly to the low-pressure steam drum (22) via a water line (27) and a steam line (41), and the low-pressure steam drum (22) is connected directly to the feedwater tank/deaerator (6) via a water line (29) and a steam line (43). During the start-up, the water/steam is circulated cascade-like from the containers of a respective higher pressure stage to containers of a respective lower pressure stage without operation of a bypass system (31, 32, 33) and heat dissipation in the condenser/hot well (4). Thus the heat remains completely in the water/steam cycle, a factor which permits a very quick start-up of the power station.

23 Claims, 1 Drawing Sheet

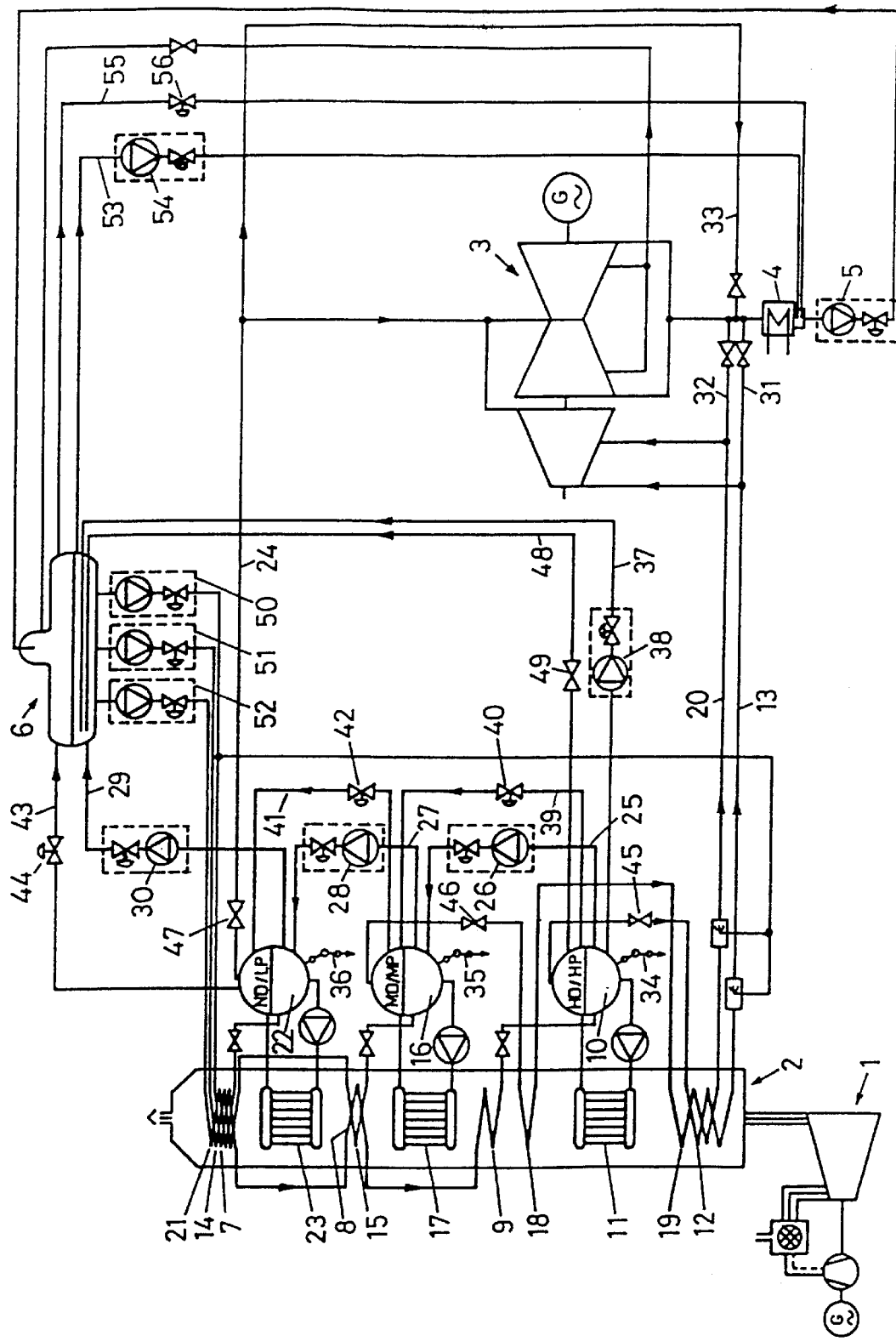

STARTING UP A STEAM SYSTEM, AND STEAM SYSTEM FOR CARRYING OUT THE METHOD

BACKGROUND OF THE INVENTION

1. Field of the Invention

The invention relates to a method of starting up a steam system having several different pressure stages, at least one container for receiving a medium circulating in the plant being arranged at each pressure stage.

Furthermore, it relates to a drum-type heat-recovery boiler and a steam system containing a drum-type heat-recovery boiler for carrying out the method and also to a combined-cycle power station having such a steam system.

2. Description of the Prior Art

During the cold start of a thermal power station having a steam turbine and, for example, a drum-type heat-recovery boiler having several different pressure stages, the steam generated in the individual pressure stages is in each case drawn off via a bypass, when the cooling system is in operation, by the condenser, which is assigned to the steam turbine and through which cooling water flows, until the generated steam meets the requirements of the steam turbine and the further conditions for the start-up of the steam turbine have been fulfilled. However, a heat quantity transferred to the steam in the heat-recovery boiler is thus dissipated to the environment via the condenser or its cooling system. The bypass operation is therefore affected by losses. In addition, the heating surfaces, in particular at the boiler end on the exhaust-gas side, remain cold for a prolonged period.

SUMMARY OF THE INVENTION

Accordingly, one object of the invention is to provide a novel method of the type mentioned at the beginning in which, during start-up operations, in particular cold starts, the heat in the region of the steam system and in particular in the region of the boiler can be retained and this heat is utilized for heating the heating surfaces, in accordance with the temperature profile over the entire steam system including the heat-recovery boiler.

According to the invention, this is achieved in that the medium, as heat transfer medium, is transferred from a respective container of a higher pressure stage to a respective container of a lower pressure stage for heating the same and its contents.

A drum-type heat-recovery boiler for carrying out the method is distinguished by the fact that a respective evaporator drum of a higher pressure stage is connected to an evaporator drum of a respective lower pressure stage via a water line.

A steam system containing a drum-type heat-recovery boiler for carrying out the method is distinguished by the fact that, from a respective container of a higher pressure stage of the heat-recovery boiler or the further components of the steam system, the medium, as a rule water, is transferred as heat transfer medium to a respective container of a lower pressure stage of the further components of the steam system for heating the same and their contents.

A combined-cycle power station having such a steam system comprises a gas turbogroup, by means of whose exhaust gas the heat-recovery boiler is heated, and a steam turbogroup, to which the steam generated in the heat-recovery boiler is fed.

Owing to the fact that, during the start-up of the steam system, no heat is dissipated from the system by cooling and the circulating medium is already utilized as heat transfer medium before the evaporation, i.e. in the liquid state, the start-up time of the steam system and thus the period up to the availability, for example, of a steam turbine can be considerably shortened.

A container of a higher pressure stage of the steam system is to be understood as a drum, but also as an economizer, an evaporator or a superheater. A container of a lower pressure stage, apart from being understood as the abovementioned units, which then work at a lower pressure stage, is also to be understood as a feedwater tank/deaerator or a condenser/hot well.

Depending on the state of the plant, the term medium refers in general to a liquid or the corresponding steam.

In the case of a heat-recovery boiler or steam power station, the media, in quite general terms, are water and steam. However, the water also normally contains additives, so that the medium cannot be designated as chemically pure water but rather as consisting mainly of water.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein a combined-cycle power station and in particular the water/steam cycle of the same are shown to the extent necessary for the understanding of the invention.

DESCRIPTION OF THE PREFERRED EMBODIMENTS

Referring now to the drawing, the combined-cycle power station, according to the single figure, has a gas turbogroup 1, the exhaust gas of which is fed to a heat-recovery boiler 2. The steam generated in the heat-recovery boiler 2 in a plurality of pressure stages is fed to a steam-turbine group 3. The exhaust steam of the steam turbogroup 3 flows into a condenser/hot well 4, following which in a known manner is a condensate pump unit 5. The condensate is delivered from the condensate pump unit 5 to the feedwater tank/deaerator 6.

To carry out the method described below, the condenser/hot well 4, in the condensate-collecting tank or hot well, has devices for heating or boiling the condensate by introducing hot water, in the ideal case saturated water and/or steam for the purpose of deaeration. This method is therefore also designated as hot-well deaeration.

The feedwater tank, in addition to the trickle deaerator shown as a dome top, for the deaeration of the condensate delivered during operation to the feedwater tank/deaerator 6 via the condensate pump unit, also has such devices in the water region specifically for the purpose of a rapid start-up of the plant.

In both cases, the gases or air expelled by the boiling of the water content are dissipated by appropriate air-extraction devices, which, however, are not shown.

In the case of pumps, the expression pump units is used, i.e. the control valve belonging to the respective pump is included in the designation pump unit.

From the feedwater tank/deaerator 6, feedwater is fed by means of the high-pressure (HP) feedwater pump unit 50 to a high-pressure economizer I 7, then flows to the high-pressure economizer II 8, to the high-pressure economizer III 9 and from the latter to the high-pressure steam drum 10.

The high-pressure steam drum 10 is connected to the high-pressure evaporator 11. Furthermore, following the high-pressure steam drum 10 is a high-pressure superheater 12, adjoining which is the high-pressure live-steam line 13, which leads to the steam turbogroup 3.

Furthermore, from the feedwater tank/deaerator 6, feedwater is delivered by means of the intermediate-pressure (IP) feedwater pump unit 51 to an intermediate-pressure economizer I 14, then flows to the intermediate-pressure economizer II 15 and from the latter into the intermediate-pressure steam drum 16. The intermediate-pressure steam drum 16 is connected to the intermediate-pressure evaporator 17. Furthermore, following the intermediate-pressure steam drum 16 are an intermediate-pressure superheater I 18 and an intermediate-pressure superheater II 19, adjoining which is the intermediate-pressure live-steam line 20, which likewise leads to the steam turbogroup 3.

Furthermore, from the feedwater tank/deaerator 6, feedwater is delivered by means of the low-pressure (LP) feedwater pump unit 52 to a low-pressure economizer 21 and flows from the latter into the low-pressure steam drum 22. The low-pressure steam drum 22 is connected to the low-pressure evaporator 23. Adjoining the low-pressure steam drum 22 is the low-pressure live-steam line 24, which likewise leads to the steam turbogroup 3.

The high-pressure economizer I 7, the high-pressure economizer II 8, the high-pressure economizer III 9, the high-pressure steam drum 10, the high-pressure evaporator 11 and the high-pressure superheater 12 together form a high-pressure system working at a first pressure stage of the steam system. Each of these construction units is a container for the circulating medium, which is present partly as liquid, in this embodiment as water, and also partly as steam. The term container therefore refers to a tube bank or a tank, e.g. a drum.

The intermediate-pressure economizer I 14, the intermediate-pressure economizer II 15, the intermediate-pressure steam drum 16, the intermediate-pressure evaporator 17, the intermediate-pressure superheater I 18 and the intermediate-pressure superheater II 19 together form an intermediate-pressure system which works at a second pressure stage of the steam system and, as described above, comprises various containers.

The low-pressure economizer 21, the low-pressure steam drum 22 and the low-pressure evaporator 23 together form a low-pressure system working at a third pressure stage of the steam system, again with various containers.

In addition to the three different pressure systems of the heat-recovery boiler, the steam system includes the feedwater tank/deaerator 6, which works at a fourth pressure stage of the steam system, and the condenser/hot well 4 working at a fifth pressure stage.

The construction of the heat-recovery boiler 2 described and of the entire steam system is merely to be considered as an example, since, as generally known, such components or systems may be designed in quite different ways. For the inventive idea, it is merely essential that there are a several (at least two) different pressure stages.

A first water line 25 now runs from the high-pressure steam drum 10 to the intermediate-pressure steam drum 16. In this exemplary embodiment, the water is delivered by a first pump unit 26. A second water line 27 having a second pump unit 28 runs from the intermediate-pressure steam drum 16 to the low-pressure steam drum 22. A third water line 29 having a third pump unit 30 leads from the low-pressure steam drum 22 to the feedwater tank/deaerator 6. Finally, a fifth water line 53 having a fifth pump unit 54 leads from the feedwater tank/deaerator to the condenser/hot well 4.

In the exemplary embodiment, the water is delivered in each case via a pump, but may also be delivered via a height difference, a pressure difference or a combination of these possibilities.

Furthermore, the figure shows a bypass system, of which three bypass lines 31, 32, 33 are shown. According to the invention, the bypass system, during the start-up of the power station, is no longer used in the previous manner, as yet to be described.

The above-described connection between the various pressure systems by the water lines 25, 27, 29 and 53 now forms a first embodiment of the invention.

After the start-up of the gas turbogroup 1, first of all the components and the water at the entry of the exhaust gases into the heat-recovery boiler are heated, in particular in the high-pressure steam drum 10 via the heating surfaces of the high-pressure evaporator 11. The reference numeral 34 designates its blow-down line. The subcooled, at best thermally saturated water in the high-pressure steam drum 16 is fed as heat transfer medium through the first water line 25 having the first pump unit 26 to the intermediate-pressure steam drum 16 at the lower pressure. The reference numeral 35 designates its blow-down line. Furthermore, the water of the intermediate-pressure steam drum 16, this water now likewise being heated, is fed through the second water line 27 having the second pump unit 28 to the low-pressure steam drum 22. Its blow-down line is designated by the reference numeral 36. The water of the low-pressure steam drum 22 is delivered through the third water line 29 having the third pump unit 30 into the feedwater tank/deaerator 6. The water then flows from the feedwater tank/deaerator 6 via the corresponding feedwater pumps through the various economizers described above back to the steam drums 10, 16, 22 in order to start the cycle again.

It can thus be seen that all the heat remains in the region of the boiler or the steam system. No heat is dissipated as loss. Furthermore, virtually simultaneous steam generation is possible in all the pressure stages, and the pressure build-up occurs very quickly in the entire system from the feedwater tank/deaerator to the high-pressure steam drum. Consequently, the deaeration in the feedwater tank/deaerator starts in the shortest time after the start-up of the gas turbogroup. Finally, the start-up time for the entire power station can thus be shortened considerably.

As a further variant, which is provided in addition to or as an alternative to the above-described embodiment, the high-pressure steam drum 10 is directly connected to the feedwater tank/deaerator 6 via a fourth water line 37 having a fourth pump unit 38. That is to say that the deaeration in the feedwater tank/deaerator can start even earlier.

In yet another embodiment of the invention, a first steam line 39 having a first valve 40 additionally leads from the high-pressure steam drum 10 to the intermediate-pressure steam drum 16. A second steam line 41 having a second valve 42 leads from the intermediate-pressure steam drum 16 to the low-pressure steam drum 22. A third steam line 43 having a third valve 44 leads from the low-pressure steam drum 22 to the feedwater tank/deaerator 6. Finally, a fifth steam line 55 having a fifth valve 56 leads from the feedwater tank/deaerator to the condenser/hot well 4.

In the present case, the flow of steam is effected due to the pressure difference between the respective containers.

A shut-off valve 45 is arranged in the steam line connecting the high-pressure drum 10 to the high-pressure superheater 12. A further shut-off valve 46 is arranged in the steam line-connecting the intermediate-pressure drum 16 to the intermediate-pressure superheater I 18, and finally a shut-off valve 47 is also arranged in the low-pressure live-steam line 24.

During the start-up in this further embodiment, the shut-off valves 45, 46, 47 are closed and the valves 40, 42, 44 in the relevant steam lines are open. Thus, directly after at least the generation of steam in the high-pressure steam drum 10, circulation of steam is effected, in a similar manner to the water circulation described, in the course of which the heat again remains in the steam system, in particular in the steam phase. The deaeration in the feedwater tank/deaerator can again start earlier. Thus, finally, the conditions for a start-up of the steam turbine of the steam turbogroup can be fulfilled very quickly.

In a similar manner to the relevant variant of the water recirculation, the high-pressure steam drum 10, in a modified embodiment, is connected directly to the feedwater tank/deaerator 6 via a fourth steam line 48 having a fourth valve 49. Owing to the fact that, during the start-up, steam is fed from the high-pressure system of the heat-recovery boiler, i.e. from the high-pressure steam drum 10, directly to the feedwater tank/deaerator 6, the deaeration in the feedwater tank/deaerator 6 starts at the earliest possible moment of the start-up of the steam system, a factor which in turn permits the realization of a very short start-up time for the entire plant.

In order to achieve a rapid start-up of a steam system, all the components of the water/steam cycle including their parameters and operating concepts have to be taken into account. First of all this means that, for heating purposes, each component assigned to the water/steam cycle, during the start-up of the system, in particular a cold start, is supplied as early as possible with water or steam until its pressure and/or temperature meets the minimum requirements for the operation of this component itself or auxiliaries (e.g. barrier-steam system, air extraction) dependent on it.

If, for example, a component requires steam for operation, with certain minimum values of pressure and/or temperature, for which purpose, for example, steam is extracted from a container of a lower pressure stage during continuous operation, this steam is not available during a first period of the start-up. Therefore this component cannot be started up to begin with.

In an embodiment of the invention, this steam having the requisite values is first of all extracted from a container of a higher pressure stage indirectly by cascading, since in this container this steam is available much earlier than in the container of the lower pressure stage. The relevant component can thus be supplied at an early stage with steam having appropriate parameters and can thus help to shorten the start-up time.

A condition for the transfer of the medium from a container of a higher pressure stage to a container of a lower pressure stage is higher parameters of pressure and/or temperature in the container of the higher pressure stage. In an appropriate manner, the transfer of the medium from a container of a higher pressure stage to a container of a lower pressure stage will only start when the pressure and/or temperature values in the container of the higher pressure stage meet said minimum requirements for the operation of the container of the lower pressure stage. Parallel start-up of a plurality of components is thus possible with this embodiment.

In the case of a container of a lower pressure stage, from which container any components of a plant which are assigned to the steam system are supplied with water and/or steam, attention must be paid to a situation in which the minimum values are not reached or the values drop below the minimum values again due to premature ending of the transfer of steam and/or water from a container of a higher pressure stage. Consequently, in this embodiment, the transfer of water and/or steam is ended at the earliest when the state of the pressure and/or temperature in the container of the lower pressure stage meets the minimum requirements of the operation in a continuous and stable manner.

A further state to be observed in the steam system is the water or steam quality. In an embodiment relating to this, the control of the transfer of water and/or steam is dependent on the water or steam quality. In order to carry out as quick a start-up as possible here too, the transfer of the medium from a respective container of a higher pressure stage to a respective container of a lower pressure stage starts at the latest when the water or steam quality in the container of the higher pressure stage meets the requirements of the steam system. That is to say that, to speed up the start-up again, operations run parallel to one another, i.e., in this case, the heating and ensuring the water or steam quality.

The deaeration of the medium should also be effected as early as possible. It is known that the start of the deaeration depends in particular on the pressure and temperature in a given container. Thus attention has again to be paid to the container of the highest pressure stage. Consequently, in a further embodiment, the transfer of the medium between containers is to be controlled in such a way that the deaeration starts as early as possible. Accordingly, the medium in a cycle is returned to the container of the highest pressure stage, in which container the respectively highest temperature prevails, until the deaeration of the medium starts in a further container as a result of water or steam recirculation. This embodiment may be realized, for example, by the direct connection shown between the high-pressure drum 10 and the feedwater tank/deaerator 6 or the condenser/hot well 4.

Depending on the plant concept, water/steam cycles with or without feedwater tank/deaerator are found nowadays in power station technology.

If a feedwater tank/deaerator is present, this feedwater tank/deaerator performs the function of supplying and deaerating the feedwater. If a feedwater tank/deaerator is not present, these two functions may also be assigned individually or separately to the condenser/hot well or the low-pressure drum of a heat-recovery boiler.

Since all three components may be additionally equipped with boiling stages, the system or method described offers a multiplicity of possibilities for the plant configuration and the corresponding operating concepts with the aim of minimum investment and maximum flexibility.

Since, according to the present inventive idea, in particular during a cold start, the heat introduced into the steam system via the exhaust gas is used to heat the existing containers and their contents, to evaporate the heat transfer medium and thus to build up pressure in the systems as well as to deaerate the heat transfer medium, the bypasses 31, 32, 33 are not used in the usual manner. Bypass operation can only be rendered necessary in a later phase, for example of a cold start, if the start-up conditions of the steam turbine are not fulfilled, as a result of restricted thermal flexibility of further components, during an aborted start and the like. Furthermore, the bypasses maintain their function, for example, for the emergency tripping of the steam turbine, or else for the shutdown of the system.

Obviously, numerous modifications and variations of the present invention are possible in light of the above teachings. It is therefore to be understood that, within the scope of the appended claims, the invention may be practiced otherwise than as specifically described herein.

What is claimed:

1. A method of starting up a steam system having at least two different pressure stages, at least one container for receiving a medium circulating in the system being arranged at each pressure stage, wherein the medium, as heat transfer medium, is transferred from a respective container of a higher pressure stage to a respective container of a lower pressure stage for heating the same and its contents.

2. The method as claimed in claim 1, wherein the medium of a container of a higher pressure stage is transferred to a container of the next lower pressure stage.

3. The method as claimed in claim 1, wherein the medium of a container of a higher pressure stage, while skipping at least one container of a lower pressure stage, is transferred to a container of a lower pressure stage.

4. The method as claimed in claim 1, wherein the transfer of the medium is effected by a pump, by a geodetic height difference, by a prevailing pressure difference between the containers or by a combination of these possibilities.

5. The method as claimed in claim 1, wherein the medium is present in the form of mainly water, steam, or a mixture thereof.

6. The method as claimed in claim 1, wherein the medium is present in the form of mainly water in a subcooled or saturated state.

7. The method as claimed in claim 1, wherein, during the start-up, the medium is used in a liquid state and, after it starts to evaporate, is used in both a liquid and a vaporous state as heat transfer medium.

8. The method as claimed in claim 1, wherein the medium in the liquid state is deaerated in a container of any pressure stage.

9. The method as claimed in claim 1, wherein the medium in the liquid state is deaerated in the container upstream of the lowest pressure stage.

10. The method as claimed in claim 1, wherein the medium in the liquid state is deaerated in the container of the lowest pressure stage.

11. The method as claimed in claim 1, in which a condenser/hot well is assigned to the steam system, wherein the condensate located in the condenser/hot well is deaerated by transfer of the medium of a higher pressure stage.

12. The method as claimed in claim 1, in which a feedwater tank/deaerator is assigned to the steam system, wherein the feedwater located in the feedwater tank/deaerator is deaerated by transfer of the medium of a higher pressure stage.

13. The method as claimed in claim 1, in which an evaporator drum is assigned to the steam system, wherein the drum water located in the evaporator drum is deaerated by transfer of the medium of a higher pressure stage.

14. The method as claimed claim 1, wherein the transfer of the medium from a respective container of a higher pressure stage to a respective container of a lower pressure stage starts at the earliest when the state of the pressure or temperature in the container of the higher pressure stage meets the minimum requirements for the operation of the container of the lower pressure stage.

15. The method as claimed in claim 1, wherein the transfer of the medium from a respective container of a higher pressure stage to a respective container of a lower pressure stage is ended at the earliest when the state of the pressure temperature in the container of the lower pressure stage meets the minimum requirements for the operation.

16. The method as claimed in claim 1, wherein the transfer of the medium from a respective container of a higher pressure stage to a respective container of a lower pressure stage starts at the latest when the water or steam quality in the container of the higher pressure stage meets the requirements of the steam system.

17. The method as claimed in claim 1, wherein the medium in the system is returned to the container of the highest pressure stage until the deaeration of the medium starts in a further container.

18. A steam system for carrying out the method as claimed in claim 1, wherein a respective container of a higher pressure stage is connected to a container of a lower pressure stage.

19. The steam system as claimed in claim 18, wherein at least one container of a lower pressure stage of the system is designed as a feedwater tank/deaerator, a condenser/hot well, or a combination thereof.

20. The steam system as claimed in claim 18, wherein a respective container of a higher pressure stage is connected to a container of a lower pressure stage via a water, steam, or water/steam line having a shut-off device.

21. A steam system containing a drum-type heat-recovery boiler for carrying out the method as claimed in claim 1, in which at least a number of containers are designed as evaporator drums, wherein a respective container of a higher pressure stage is connected to an evaporator drum or a further container of a respective lower pressure stage via a water line having a shut-off device.

22. A steam system containing a drum-type heat-recovery boiler for carrying out the method as claimed in claim 1, in which at least a number of containers are designated as evaporator drums, wherein a respective container of a higher pressure stage is connected to an evaporator drum or a further container of a respective lower pressure stage via a steam line having a shut-off device.

23. A combined-cycle power station having a steam system as claimed in claim 18, which comprises a gas turbogroup, by means of whose exhaust gas the heat-recovery boiler is heated, and a steam turbogroup, to which the steam generated in the heat-recovery boiler is fed.

* * * * *